United States Patent
Boivin et al.

[11] Patent Number: 6,137,611
[45] Date of Patent: Oct. 24, 2000

[54] SUPPRESSION OF COHERENT RAYLEIGH NOISE IN BIDIRECTIONAL COMMUNICATION SYSTEMS

[75] Inventors: Luc Boivin, Eatontown; Robert D. Feldman, Middletown; Martin C. Nuss, Fair Haven, all of N.J.

[73] Assignee: Lucent Technologies Inc., Murray Hill, N.J.

[21] Appl. No.: 08/937,299

[22] Filed: Sep. 27, 1997

[51] Int. Cl.[7] .................................................. H04B 10/00
[52] U.S. Cl. ......................... 359/168; 359/169; 359/170
[58] Field of Search .................................. 359/168, 169, 359/170, 126, 114

[56] References Cited

U.S. PATENT DOCUMENTS

| | | | |
|---|---|---|---|
| 4,879,763 | 11/1989 | Wood | 455/607 |
| 5,063,560 | 11/1991 | Yerbury et al. | 370/18 |
| 5,559,624 | 9/1996 | Darcie et al. | 359/125 |
| 5,572,612 | 11/1996 | Delavaux et al. | 385/24 |
| 5,724,149 | 3/1998 | Stallard et al. | 359/110 |
| 5,864,413 | 1/1999 | Feldman et al. | 359/125 |
| 5,909,294 | 6/1999 | Doerr et al. | 359/114 |

OTHER PUBLICATIONS

"Observation of Coherent Rayleigh Noise in Single–Source Bidirectional Optical Fiber Systems," T. H. Wood, et al., J. Lightwave Tech., vol. 6, No. 2, Feb. 1988, pp. 346–352.

"A Wavelength–Division Multiplexed Passive Optical Network with Cost–Shared Components," N. J. Frigo, et al., IEEE Phot. Tech. Ltrs., vol. 5, No. 11, Nov. 1994, pp. 1365–1367.

"Statistical Properties of Rayleigh Backscattering in Single–Mode Fibers," P. Gysel, et al., J. Lightwave Tech., vol. 8, No. 4, Apr. 1990, pp. 561–567.

*Primary Examiner*—Leslie Pascal
*Assistant Examiner*—Dalzid Singh
*Attorney, Agent, or Firm*—J. J. Brosemer

[57] ABSTRACT

Low-noise, bidirectional communications in a fiber optic cable is achieved by coupling a first end of the cable to an optical power source having an inherently broad spectral width. A second end of the cable is coupled to an optical detector having a detector bandwidth, such that the bandwidth of the optical power source is greater than the detector bandwidth. When the bandwidth of the optical power source is large compared to the bandwidth of the detector, the beat frequencies resulting from coherent Rayleigh noise fall outside the bandwidth of the detector and are not detected.

8 Claims, 2 Drawing Sheets

SUPPRESSION OF COHERENT RAYLEIGH NOISE IN BIDIRECTIONAL COMMUNICATION SYSTEMS

BACKGROUND OF THE INVENTION

1. Field of the Invention

The invention relates generally to optical communications systems, and more particularly to bidirectional transmission of optical signals.

2. Description of the Related Art

Various fiber optic communication systems have been developed for conveying information bidirectionally to and from a first location and a second location. Some of these systems employ a laser only at the first location, whereas, at the second location, an unused portion of the laser light is "ooped back" to the first location. This looped back laser light may be encoded with data by means of an optical modulator. Examples of such systems are disclosed in U.S. Pat. No. 4,879,763, entitled, "Optical Fiber Bidirectional Transmission System," and U.S. Pat. No. 5,559,624, entitled, "Communication System Based on Remote Interrogation of Terminal Equipment". One advantage of these optical communication systems is that a laser source is only required at one end of the system, while less expensive modulators can be used at the other end.

Bidirectional optical communication systems using looped back laser light are useful in applications such as wavelength-division-multiplexed (WDM) access networks. WDM networks employ a laser at a first location, which is typically a central office, and utilize a plurality of Optical Network Units (ONU's) situated at a plurality of second locations. The ONU's are commonly located at or near customer premises, where environmental conditions such as temperature and humidity may vary over a relatively wide range. For this reason, it is difficult to provide accurate wavelength registration at the ONU locations. The looped back laser light provides automatic wavelength registration at the ONU locations, because the same wavelength of light that was transmitted from the laser at the central office is sent back to the central office by the ONU.

One shortcoming of using looped back laser light to provide a bidirectional communications system is that coherent Rayleigh noise significantly limits the performance of the system. The phenomenon of Coherent Rayleigh noise is discussed in greater detail in U.S. Pat. No. 4,879,763, issued to Thomas H. Wood, and also in an article by T. H. Wood, R. A. Linke, B. L. Kaspar, and E. C. Carr, "Observation of coherent Rayleigh noise in single-source bidirectional optical fiber system," Journ. Lightwave Techn., Vol. 6, pp. 346–352 (1988). Coherent Rayleigh Noise (CRN) arises when light traveling from the central office laser, to the modulator, and back to a detector at the central office, interferes with light that was back scattered by the fiber optic cable throughout the entire length of the fiber. Although the scattered signal and the signal travelling to and from the central office (the looped back signal) both originate from the same source, these signals have each encountered different delays between the laser and the detector. Therefore, the scattered signal beats with the looped-back signal, thereby generating a noise spectrum that is roughly proportional to the laser line width. Beat interference is also caused by discrete reflections from optical fiber splices, optical couplers, and optical splitters that exist between the central office and an ONU.

Substantially all of the noise spectra within the electrical bandwidth of a detector will be detected by that detector. Since the detector bandwidth is tied to the communications bit rate, the minimum electrical bandwidth of the detector is usually fixed. For example, for NRZ (non return to zero) signals, the electrical bandwidth of the receiver cannot be made less than 0.7 times the bit rate. Therefore, beyond a certain point, one cannot improve signal-to-noise ratio merely by reducing the detector bandwidth. If one is already operating at the minimum practicable detector bandwidth as determined by the desired bit rate of a given system, one must resort to other techniques to improve signal-to-noise ratio.

Various techniques have been developed to address the problem of coherent Rayleigh noise in bidirectional optical communications systems. These techniques have been adapted for an operational environment where a continuous-wave laser, such as a Fabry-Perot or distributed-feedback (DFB) semiconductor laser, is used as the light source at the Central Office. One approach to minimizing coherent Rayleigh noise, involving the use of separate fibers for up- and downstream traffic, is disclosed in U.S. Pat. No. 5,559,624, entitled, "Communication System Based on Remote Interrogation of Terminal Equipment". Although effective at eliminating the adverse consequences of Rayleigh noise, this solution adds considerably to the cost of the system and negates the simplicity of using a laser only at one end of the communications system.

Another prior art solution for overcoming coherent Rayleigh noise is frequency dithering of the laser source to change the spectral characteristics of the source. This technique is effective to the extent that it reduces the amount of noise power that falls within the receiver bandwidth. This frequency dithering technique is described in greater detail in a paper by T. H. Wood, R. A. Linke, B. L. Kaspar, and E. C. Carr, entitled, "Observation of Coherent Rayleigh Noise in Single-Source Bi-directional Optical Fiber System," Journ. Lightwave Techn., Vol. 6, pp. 346–352 (1988). Unfortunately, this method leads to an incomplete suppression of the coherent Rayleigh noise. Since the electrical bandwidth of the receiver is tied to the bit rate, this method is not effective when the bandwidth of the communication system becomes larger than the spectral broadening that can be obtained by dithering.

Yet another technique which addresses the problem of coherent Rayleigh noise is to shift the frequency of the light at the location of the modulator. This may be accomplished by using an acousto-optic modulator, so that up- and downstream wavelengths are different, thus ideally eliminating interference altogether. This approach is described in U.S. Pat. No. 5,572,612, entitled, "Bidirectional Optical Transmission System". However, changing the frequency of light at the modulator increases the complexity and cost of the optical network unit (ONU) at the customer premises, contrary to the original intent of saving cost and complexity by replacing a laser with a modulator at the ONU. Moreover, since a typical system may utilize many ONUs for each central office laser, the cost of furnishing a special high-frequency modulator to each ONU is multiplied by the relatively higher number of ONUs that are used relative to each central office. What is needed is an improved technique for overcoming coherent Rayleigh noise in a bidirectional optical communications system.

SUMMARY OF THE INVENTION

Low-noise, bidirectional communications in a fiber optic cable is achieved by coupling a cable to an optical power source having an inherently broad spectral bandwidth. The cable is coupled to an optical detector having an electrical detector bandwidth, such that the spectral bandwidth of the optical power source is greater than the electrical detector bandwidth. When the spectral bandwidth of the optical power source is large compared to the electrical bandwidth of the detector, a sufficient portion of the beat frequencies resulting from coherent Rayleigh noise fall outside the bandwidth of the detector, so as to reduce coherent Rayleigh noise to a tolerable level.

DETAILED DESCRIPTION OF THE PREFERRED EMBODIMENTS

Figure 1:
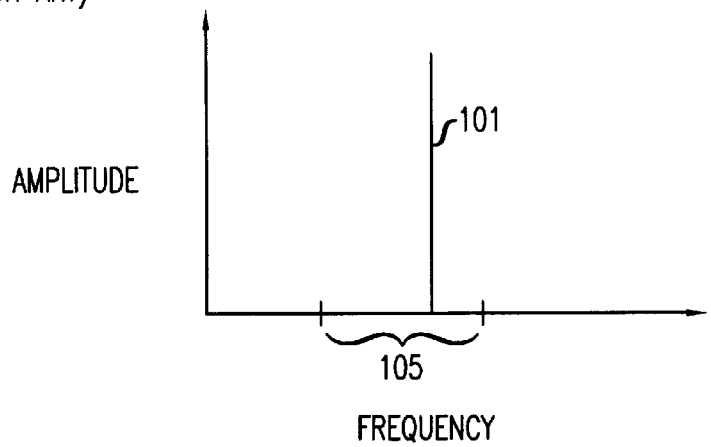
FIG. 1 is a graph showing the frequency spectrum of a prior-art optical power source utilized in a bidirectional optical communications system.

Disclosed herein are techniques for substantially reducing the coherent Rayleigh noise of a fiber optic cable used to provide bidirectional communications. This reduction in noise is achieved by coupling a cable to a broad band optical power source. The cable is also coupled to an optical detector having a detector bandwidth, such that the spectral bandwidth of the optical power source is greater than the electrical bandwidth of the detector. When the spectral bandwidth of the optical power source is large compared to the electrical bandwidth of the detector, i.e., at least twice as large as the bandwidth of the detector, the beat frequencies resulting from coherent Rayleigh noise fall outside the bandwidth of the detector and are not detected.

Pursuant to a first illustrative embodiment of the invention, a broad band optical power source is coupled to a fiber optic cable. The power source generates optical energy substantially within a first bandwidth. An optical detector is coupled to the fiber optic cable, and the detector is adapted to detect optical energy substantially within a second bandwidth. The first bandwidth is selected to be greater than the second bandwidth, where the second bandwidth falls within the first bandwidth. When the first, bandwidth is sufficently greater than the second bandwidth, beat interference resulting from the inherent, coherent Rayleigh noise of the cable fall outside the second bandwidth and is not detected.

The substantial reduction in coherent Rayleigh noise (CRN) occurs because the broad band optical power source contains many frequency components. If the spectral bandwidth of the power source is large compared to the bandwidth of the detector, most of the beat frequencies resulting from CRN will fall outside the bandwidth of the detector at the central office and will, hence, not be detected. More specifically, the instantaneous power resulting from multi-path interference between the signal power $P_S$ and the power $P_R$ reflected by Rayleigh scattering is:

$$P_{tot} = P_S + P_R + 2\sqrt{P_S P_R}\cos\theta,$$

where θ is the phase angle between the signal and reflected light, respectively. The variance of the instantaneous power is therefore:

$$\langle \Delta P_{tot}^2 \rangle \cong 2 P_S P_R.$$

The above equation shows that even if the reflected power is 100 times smaller than the signal, the total power can vary by ±20% depending on the phase angle. Usually, the phase angle varies because of environmental changes in the fiber, but also varies if the linewidth of the light source is finite. In this case, the spectrum of the total power $P_{tot}$ replicates the linewidth of the source. As the spectral bandwidth of the source becomes larger, the variance of the total photocurrent I detected within the receiver bandwidth $\nu_{detector}$ becomes smaller:

$$\langle \Delta I_{tot}^2 \rangle \cong 2\varepsilon I_S I_R.$$

Here, ε is the ratio of the detector bandwidth $\nu_{detector}$ and the spectral bandwidth Δν of the source.

For example, refer to FIG. 1 which shows the frequency spectrum 101 of a prior-art optical power source utilized in a bidirectional optical communications system. Such an optical power source is commonly provided in the form of a continuous-wave laser. The spectral bandwidth 101 of the laser, denoted mathematically as Δν, is much narrower than the electrical bandwidth of the detector used to receive optical energy emitted by the laser, shown in FIG. 1 as detector bandwidth 105. As described earlier, the detector bandwidth is generally kept quite close to the bit rate of the communications signal. A typical continuous-wave laser has a spectral bandwidth Δν of several megahertz. For a communications system operating at 52 Mb/s, all of the beat frequencies occur within a bandwidth Δν<<50 Mhz. Therefore, for a receiver bandwidth of approximately 50 Mhz, which is a fairly representative figure, virtually all of the noise is detectable at the receiver.

By contrast, a spectrally sliced source, such as an amplified LED source, may have a spectral bandwidth of Δν=50 GHz. Here, only $\frac{1}{1000}$ of beat frequencies are detected within the 50 Mhz frequency bandwidth of the receiver. For the same average power transmitted, a spectrally sliced broadband optical power source provides vastly improved signal-to-noise ratio than a coherent laser source. Note that the use of a spectrally sliced source is substantially simpler than the frequency dithering of a continuous-wave laser proposed in the prior art. First, no dithering mechanism needs to be included at the laser source, and secondly a much larger spectral source bandwidth can be achieved using spectral slicing than by the dithering method, leading to more complete suppression of CRN.

Figure 2:
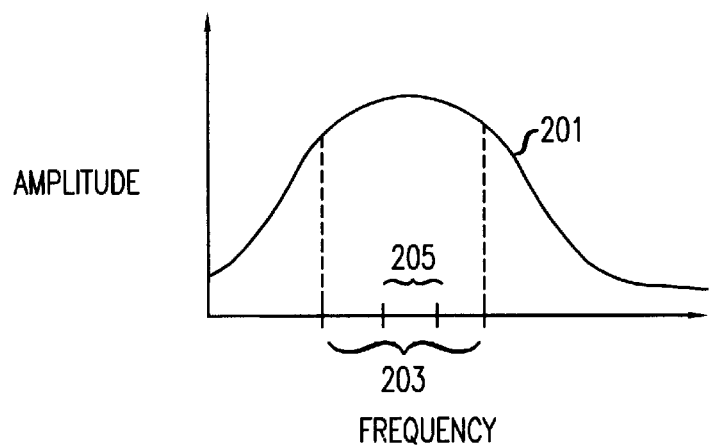
FIG. 2 is a graph showing the frequency spectrum of a broad band optical power source utilized in a bidirectional optical communications system according to an embodiment of the invention disclosed herein.

FIG. 2 is a graph showing the frequency spectrum of an optical power source with inherently broad spectral bandwidth utilized in a bidirectional optical communications system according to an embodiment of the invention disclosed herein. The optical power source can be provided, for example, using any number of coherent, or incoherent, sources which are capable of providing broad band optical energy. For example, a spectrally-sliced source of optical energy could be used, although it is not required to spectrally slice the source. Examples of incoherent broabband sources include Light Emitting Diodes (LEDs), amplified LEDs, and amplified spontaneous-emission sources such as erbium-doped-fiber-amplifier (EDFAs). Examples of coherent broadband sources, or sources having reduced coherency, include mode-locked lasers, self-pulsating lasers, and lasers wherein the effective bandgap is varied. Alternatively, it is possible to transmit a fraction of the entire optical spectrum to each ONU using a wavelength-independent power coupler (splitter). In this case, the optical bandwidth of the entire spectrum must be large compared to the electrical bandwidth shown in FIG. 2 as reference numeral 205.

Curve 201 of FIG. 2 is a frequency response curve which may be representative of any of the aforementioned broadband optical energy sources. Note the relatively broadbanded characteristic of curve 201 relative to the frequency response 101 of the laser described in FIG. 1. A filter having a frequency bandwidth shown as spectral slice 203 is applied to the optical energy source, effectively rejecting optical energy falling outside of spectral slice 203. As described above, the bandwidth of spectral slice 203 should be selected to be wider than the detector bandwidth of the receiver used to receive the filtered optical energy source. This detector bandwidth is shown in FIG. 2 as bandwidth 205.

Figure 3:
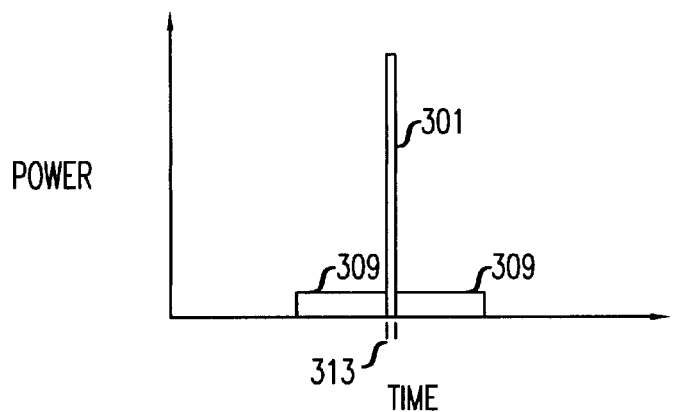
FIG. 3 is a graph comparing the instantaneous optical power of a bidirectional optical signal with that of an optically-backscattered signal.

FIG. 3 is a graph illustrating an alternate embodiment of the invention disclosed herein wherein the optical power source having inherently broad spectral width is a coherent broadband source of light. One example of a coherent broadband optical energy source is a mode-locked laser. Use of a mode-locked laser is a very special case, in that the bandwidth of the laser could, but need not be wider than the detector bandwidth. In this special case, the relationship of the laser bandwidth to the detector bandwidth is not of critical significance. More importantly, the laser is operated in a pulsed manner such that the pulse widths are relatively short compared to the length of a bit period T, referred to as the duty cycle of the laser. For example, it would be desirable to operate the laser using a pulse duration at least an order of magnitude less than a bit period T. In this embodiment, the laser, as well as a receiver, are coupled to a section of fiber optic cable. The receiver compares the instantaneous optical power of a bidirectional optical signal with that of an optically-backscattered signal.

When a coherent source of optical energy, such as a mode-locked laser, is used, pursuant to the alternate embodiment described in the preceding paragraph, additional techniques are available for the suppression of coherent Rayleigh noise. Since Rayleigh scattering is caused by scattering up and down the entire length of a fiber optic cable and, indeed, over the entire length of an optical communication system, the backscattered light $P_R$, shown in FIG. 3 as backscatter 309, always extends over an entire bit period T, irrespective of the duration 313 of a signal pulse 301. However, the duration 313 of the signal pulse 301 is $\epsilon T$, where $\epsilon$ is the duty cycle of the signal, so that the peak signal becomes $P_S/\epsilon$, where $P_S$ is the average power of the signal. The CRN is related to $$\sqrt{P_S P_R},$$

so that the signal-to-noise ratio increases as the duty cycle of the signal pulses becomes smaller:

$$\frac{S}{N} \propto \frac{1}{\epsilon} \cdot \sqrt{\frac{P_S}{P_R}}.$$

In comparison to the situation described above with spectrally sliced sources that are not short modelocked pulses, the detector bandwidth in this case does not need to be smaller than the spectral bandwidth of the source. However, in order to realize this advantage, some sort of dispersion compensation needs to be built into the communications systems that keeps short pulses from spreading out in time or, alternatively, compresses the signal to a short pulse again before detection.

Figure 4:
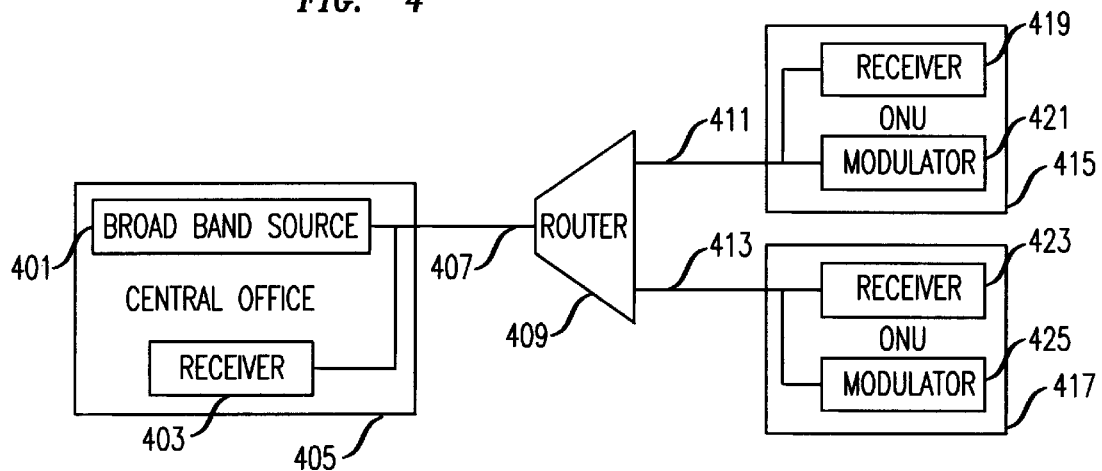
FIG. 4 is a hardware block diagram showing a bidirectional optical WDM communications system constructed in accordance with a first embodiment disclosed herein.

FIG. 4 is a hardware block diagram showing a bidirectional optical communications system constructed in accordance with a first embodiment disclosed herein. This embodiment may be conceptualized as a single-fiber version of a fiber access communication system which uses a broad band source 401 of optical energy at a Central Office (CO) 405, and a modulator 421 at each of a plurality of Optical Network Units (ONUs) 415, 417. Broad band source 401 can be implemented using any broadband light source, including sources having frequency spectra roughly similar to that shown in FIG. 2. For example, broad band source 401 can be provided using any of a number of sources of optical energy, including coherent, as well as incoherent, sources. Examples of incoherent sources include Light Emitting Diodes (LEDs) and amplified spontaneous-emission sources such as erbium-doped-fiber-amplifier (EDFAs). One example of a coherent source is a mode-locked laser. The broad band source 401 is coupled to a first end of a first section of fiber optic cable 407. A receiver 403 is also coupled to the first end of the first section of fiber optic cable 407 to receive looped back optical signals from ONUs 415, 417.

A second end of the first section of fiber optic cable 407 is coupled to an input port of router 409. Router 409 can be implemented using any of a variety of wavelength-division-multiplexed routers, examples of which are well known to those skilled in the art. One illustrative router suitable for use as router 409 is a waveguide grating router (WGR), although other types of routers could also be used to implement router 409. The input port of router 409 accepts a composite WDM signal containing a plurality of sets of WDM channels, and routes respective sets of WDM channels to one or more corresponding output port(s).

A first output port of router 409 is coupled to a first end of a second section of fiber optic cable 411. The second end of the second section of fiber optic cable 411 is coupled to a receiver 419 and a modulator 421. Together, receiver 419 and modulator 421 comprise ONU 415. A second output port of router 409 is coupled to a first end of a third section of fiber optic cable 413. The second end of the third section of fiber optic cable 413 is coupled to a receiver 423 and a modulator 425. Together, receiver 423 and modulator 425 comprise ONU 417.

In operation, broad band source 401 sends a WDM signal including a plurality of WDM channel sets down first section of fiber optic cable 407. The WDM signal is received by the router 409, which separates respective WDM channel sets from the WDM signal, and, for example, routes each respective separated channel set to a corresponding output port. Note that, if desired, the router 409 could be configured to route the same channel set to a plurality of output ports, and/or some channel sets may not be routed to any output port. By way of illustration, a first WDM channel set is routed to the first output port of router 409, and is coupled to second section of fiber optic cable 411. A second WDM channel set is routed to the second output port of router 409, and is coupled to third section of fiber optic cable 413.

Upon receiving the first WDM channel set, the receiver 419 of ONU 415 signals modulator 421 to modulate a portion of the signal received from router 409 on the second section of fiber optic cable 411. This modulated signal is sent along the second section of fiber optic cable 411, from ONU 415 through router 409, and over first section of fiber optic cable 407, where the modulated signal is received by receiver 403 of central office 405. Similarly, upon receiving the second WDM channel set, the receiver 423 of ONU 417 signals modulator 425 to modulate a portion of the signal received from router 409 on the third section of fiber optic cable 413. This modulated signal is sent along the third section of fiber optic cable 413, from ONU 417 through router 409, and over first section of fiber optic cable 407, where the modulated signal is received by receiver 403 of central office 405.

One distinction of the system of FIG. 4 with respect to the prior art is the use of broad band source 401 at the central office. Another distinction of the system of FIG. 4 over the prior art is that prior art systems require additional, "return" runs of fiber optic cable to carry the modulated signal from the modulators 421, 425 of the ONUs 415, 417 back to the receiver 403 at the central office 405. Prior art systems cannot utilize first, second, and third sections of fiber optic cable 407, 411, and 413 to carry bidirectional transmissions due to the existence of the CRN problem in these prior art systems. Accordingly, a prior art system using the number of ONUs shown in FIG. 4 requires a fourth section of fiber optic cable to carry the modulated signal from ONU 415 to router 409, a fifth section of cable to carry the modulated signal from ONU 417 to router 409, and a sixth section of cable to carry the modulated signal from the router 409 to the receiver 403.

By contrast, the system of FIG. 4 eliminates the need for these "return" fibers, i.e., fourth, fifth, and sixth sections of cable. In the embodiment of FIG. 4, both up- and downstream traffic is now carried on the first, second, and third sections of fiber optic cable 407, 411, 413. Note that power splitters or optical circulators coupd be employed at the central office 405, and/or the ONUs 415, 417 to facilitate the separation of up- and downstream traffic. It should be clear that the same principles discussed above in connection with FIG. 4 may be used in a bidirectional communications system that does not utilize wavelength-division multiplexed signals.

Figure 5:
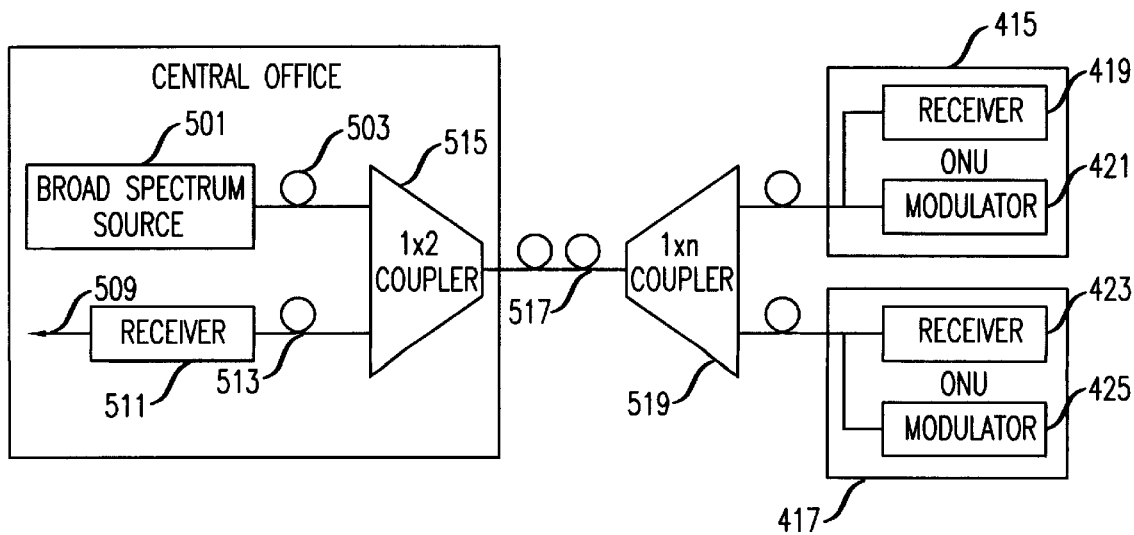
FIG. 5 is a hardware block diagram showing a bidirectional optical communications system constructed in accordance with a second embodiment disclosed herein.

FIG. 5 is a hardware block diagram showing a bidirectional optical communications system constructed in accordance with a second embodiment disclosed herein. One notable feature of the system of FIG. 5 is the use of a 1×n coupler 519. Note that no WDM router is present. The configuration of FIG. 5 uses a broad spectrum source 501, which may have a spectrum similar to that shown in FIG. 2. A first section of fiber optic cable 503 conveys optical energy from broad spectrum source 501 to a first port of a 1×2 coupler 515 having first, second, and third ports.

The second port of the 1×2 coupler is coupled to a first end of a third section of fiber optic cable 517. In practice, third section of fiber optic cable 517 may be utilized to traverse a relatively great distance such as, for example, 18 kilometers. The second end of the third section of fiber optic cable 517 is coupled to a first port of a 1×n 519 coupler. The third port of the 1×2 coupler 515 is coupled to a first end of a fourth section of fiber optic cable 513, and the second end of the fourth section of fiber optic cable 513 is coupled to a receiver 511.

1×n coupler 519 has n output ports, some or all of which are coupled to ONUs via sections of fiber optic cable. In the example of FIG. 5, these ONUs include ONU 415 and ONU 417. Each ONU 415, 417 includes a corresponding receiver 419, 423, and a corresponding modulator 421, 425.

In operation, broad spectrum source 501 is used to generate a broad band optical signal, which is fed to the first port of 1×2 coupler 515, appears at the second port of 1×2 coupler, and traverses third section of fiber optic cable 517, and then arrives at 1×n coupler 519. 1×n coupler couples this optical signal to the n output ports, where the signal travels to ONUs 415 and 417. Upon reaching the modulator 421, 425 of an ONU 415, 417, a modulating device reflects a portion of the signal back to the 1×n coupler 519, down the third section of fiber optic cable 517, towards 1×2 coupler 515. The reflected signal travels into the second port of the 1×2 coupler 515, and travels out the first port of the 1×2 coupler 515, where the reflected signal is then received at receiver 511.

FIGS. 4 and 5 set forth illustrative embodiments of the invention described herein, and, as such, are not intended to limit the scope of the invention in any way.

What is claimed is:

1. A method of providing low-noise, bidirectional communications using a fiber optic cable, the method including the steps of:

(a) coupling the cable to a broadband optical power source having a first optical bandwidth; and (b) coupling the cable to an optical detector having an electrical second bandwidth, such that the first bandwidth is greater than the second bandwidth;

wherein the first optical bandwidth is sufficiently greater than the second electrical bandwidth, such that a sufficient portion of the beat frequencies resulting from coherent Rayleigh noise fall outside the bandwidth of the detector, so as to substantially reduce coherent Rayleigh noise.

2. A system for providing low-noise, bidirectional communications on a fiber optic cable, the system comprising:

(a) an optical power source having an inherently broad spectral bandwidth and coupled to the fiber optic cable; the power source generating optical energy substantially within an optical first bandwidth; and (b) an optical detector coupled to the fiber optic cable, the detector adapted to detect optical energy substantially within an electrical second bandwidth, such that the first bandwidth is greater than the second bandwidth;

wherein the optical first bandwidth is sufficiently greater than the electrical second bandwidth, such that a sufficient portion of the beat frequencies resulting from coherent Rayleigh noise fall outside the bandwidth of the detector, so as to substantially reduce coherent Rayleigh noise.

3. The system of claim 2 wherein the optical power source is an erbium-doped fiber amplifier.

4. The system of claim 2 wherein the optical power source and the optical detector are both coupled to a first end of the fiber optic cable, the system further comprising a modulator coupled to a second end of the fiber optic cable, the modulator adapted to modulate optical energy generated by the optical power source for detection by the optical detector.

5. The system of claim 4 wherein the modulator is a reflective modulator.

6. The system of claim 4 further comprising at least one of a first receiver coupled to the optical power source and a second receiver coupled to the modulator.

7. The system of claim 6 wherein the fiber optic cable is comprised of a plurality of fiber optic cable sections.

8. The system of claim 6 wherein the fiber optic cable is comprised of a plurality of fiber optic cable sections and a router disposed between any two said fiber optic cable sections.

* * * * *